UNITED STATES PATENT OFFICE.

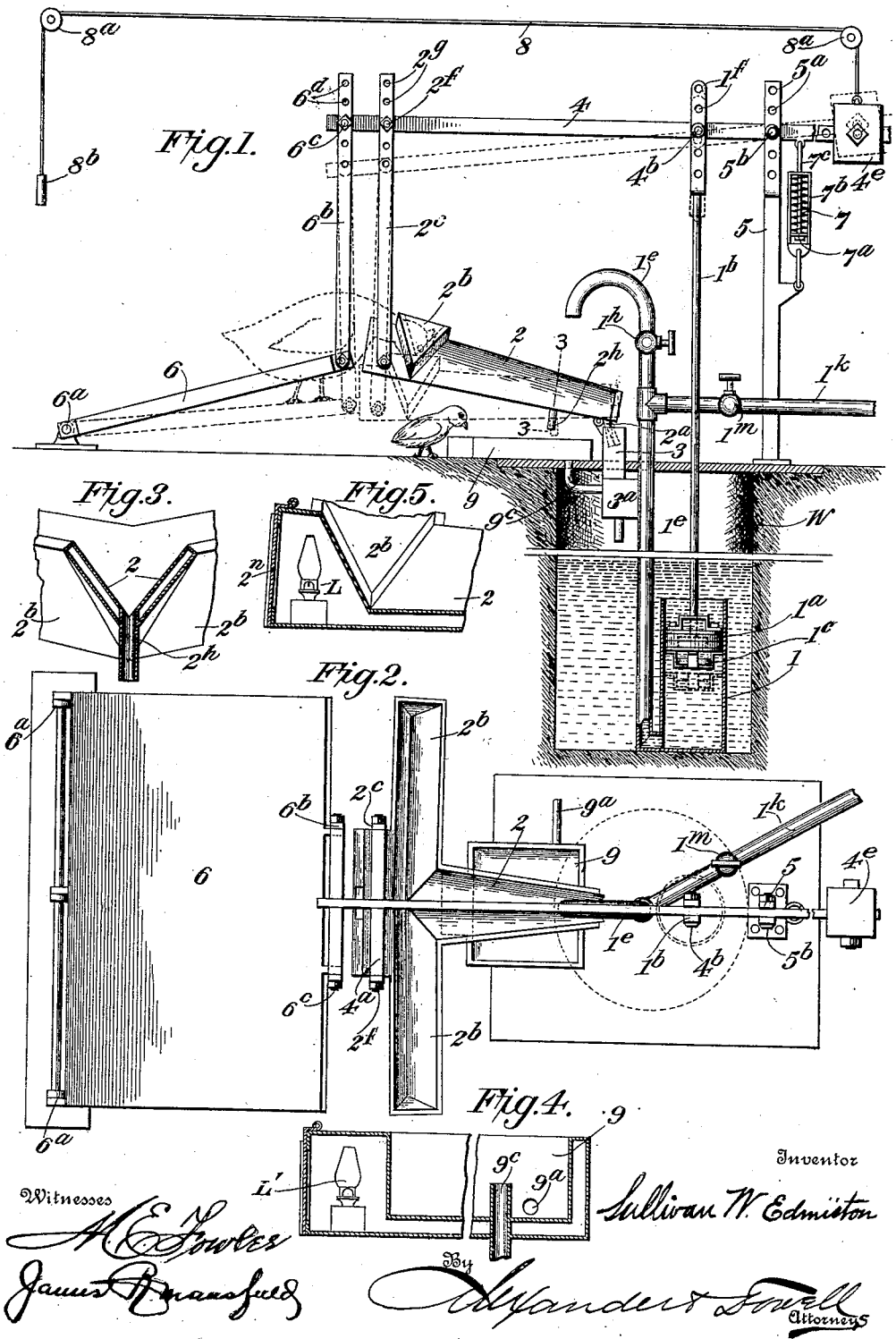

SULLIVAN W. EDMISTON, OF HILLSBORO, OHIO.

PUMPING APPARATUS.

No. 910,800.   Specification of Letters Patent.   Patented Jan. 26, 1909.

Application filed November 18, 1908. Serial No. 463,204.

*To all whom it may concern:*

Be it known that I, SULLIVAN W. EDMISTON, of Hillsboro, in the county of Highland and State of Ohio, have invented certain new and useful Improvements in Pumping Apparatus; and I hereby declare that the following is a full, clear, and exact description thereof, reference being had to the accompanying drawings, which form part of this specification.

This invention is an improved apparatus for pumping water from wells and cisterns, and is designed to be operated by the weight of the animals or fowls when they come to the well for water.

The objects of the invention are to enable the animal to automatically pump its own drinking water; to economize the water by preventing waste thereof; to return unused water, if desired, back to the cistern or well; to filter such water before it is returned into the well; to regulate the amount of water pumped according to the size and weight of the animal; and to enable small fowls to be supplied with water; and to prevent the water troughs and receptacles freezing in cold weather.

The invention will now be described with reference to the accompanying drawings, in which—

Figure 1 is a side elevation of the complete apparatus, showing it partly in section, and applied to a well; also showing the parts in raised or non-watering position, in full lines; and in lowered, water-supplying position, in dotted lines. Fig. 2 is a top plan view of Fig. 1. Fig. 3 is an enlarged cross section of the trough on line 3—3, Fig. 1. Fig. 4 is an enlarged detail section of the stationary water-receptacle. Fig. 5 is a detail sectional view of the rear end of the water trough.

The apparatus comprises a pump-chamber 1, located in the well or cistern W, below the water level, and having a plunger $1^a$ connected to a piston rod $1^b$. Said plunger is provided with a valve $1^c$, adapted to open when the plunger rises, and close when the plunger lowers. The chamber 1 is connected below the plunger with a pipe $1^e$ which extends up above the well and is arranged to discharge into a trough 2 of peculiar construction. This trough 2 is preferably made of metal, and with double walls, the space between the walls forming a hot-air chamber, which can be heated by a lamp L, that can be placed in the hollow end of the trough through a door $2^n$ in the outer wall thereof, as indicated in the drawings. The lamp is used in cold weather so as to keep the sides of the trough sufficiently warm to prevent the water freezing thereon.

The receiving end of the trough is provided with a discharge spout $2^a$, which enters a return pipe 3, that leads into a filter $3^a$, which in turn discharges into the well, so that water not used will be returned from the trough filtered and discharged into the well, if desired.

The filter may be of any suitable construction. The outer end of the trough 2 is suspended by links $2^c$ from a cross piece $4^a$, attached to an overhead lever 4, which is pivoted by a bolt $5^b$ on an upright 5 beside the well. The plunger rod $1^b$ is also pivotally connected by a bolt $4^b$ to the lever 4. The rod $1^b$ may have a series of holes $1^f$ in its upper end, with either of which bolts $4^b$ can be engaged, thus providing an adjustment for the plunger rod. Similarly the upright 5 may be provided with a series of holes $5^a$ with any of which the bolt $4^b$ may be engaged, to vary the point of connection of the lever 4 thereto. The links $2^c$ may be connected to cross piece $4^a$ by bolts $2^f$ that can be engaged with any one of a series of holes $2^g$ in the links to vary the normal inclination of the trough.

The trough 2 is preferably provided with lateral branches $2^b$, which will allow several animals to drink at the same time, these branches being preferably double walled, (so as to be kept warm by lamp L also), and are slightly inclined so that when the trough is raised, as indicated in full lines in Fig. 1, all the water therein will drain back to pipe $2^a$. The trough furthermore is provided with a pipe $2^h$ which can be opened if desired, so as to allow water to escape from the trough into a receptacle 9, placed beneath the trough, and forming a convenient watering place for small stock and fowls. This receptacle is preferably double-walled, and may also be heated in cold weather by a lamp $L^1$ placed therein as indicated in the drawings, so that it will not freeze. A platform 6 is arranged beside the trough, as shown, and is pivoted at $6^a$ at one side, and its other side is suspended by links $6^b$ from the end of lever 4, links $6^b$ being connected to lever 4 by a bolt $6^c$ which can be engaged with any one of a series of holes $6^d$ in said links, to vary the inclination of said platform. The other end of lever 4 is weighted, as at 4ᵉ, in any suitable manner, so as to slightly more than counterbalance the weight of the suspended portions of the trough, platform and plunger, so that normally these parts are upheld in the position shown in full lines in Fig. 1, so that the trough will empty itself. But if an animal comes onto the platform 6, its weight overcomes that of weight 4ᵉ, and the parts descend to the position indicated in dotted lines in Fig. 1. The descent of the plunger in the pump-chamber causes water to flow out of pipe 1ᵉ into the trough 2, and supply the animal with sufficient water to slake its thirst. The larger the animal the greater the amount of water raised. When the animal leaves the platform, the weight 4ᵉ again raises the parts to the position shown in Fig. 1, in full lines, and the water flows back to the filter and well; or it may be permitted to pass through pipe 2ʰ into the receptacle 9.

In order to regulate the supply of water spring 7 may be used to resist the movement of lever 4 beyond a certain point in the pumping operation. I have shown a compression spring 7, confined between loops 7ª, 7ᵇ, the former of which is connected by a link 7ᶜ to lever 4, at the side adjacent the weight 4ᵉ, and the other link 7ᵇ is attached to upright 5. The spring 7 is so adjusted and connected to the upright and lever that if but one animal comes onto the platform 6, it will actuate lever 4 sufficient to deliver enough water to satisfy it; if now another animal comes upon the platform the lever will be further depressed, against the resistance of spring 8; and if still another animal comes onto the platform the lever will be still further depressed. By this means I regulate the amount of water pumped, approximately according to the size and wants of the animal, or animals, coming onto the platform and thus prevent waste.

If desired a cable 8 may be attached to lever 4, and led over suitable guide pulleys 8ª, to any desired point, where it may be provided with a pull or lever 8ᵇ; so that a person can operate the pump from a distance by pulling on the cable, when no fowl or animal is on the platform. If desired the water can be carried from receptacle 9, through suitable pipes 9ª, to any desired point. Or any overflow therefrom can be discharged back into the filter 3ª by pipe 9ᶜ. If desired the pipe 1ᵉ may be provided with a valve 1ʰ and a pipe 1ᵏ connected with pipe 1ᵉ below valve 1ᵏ, and provided with a valve 1ᵐ. By closing valve 1ʰ and opening valve 1ᵐ, water can be forced through pipe 1ᵏ to any point desired when the pump is operated. By closing valve 1ᵐ and opening valve 1ʰ the water will be delivered into the trough as usual.

Having described my invention what I desire to secure by Letters Patent thereon is:

1. A pumping apparatus, comprising a pump-chamber, a pivoted platform, an oscillating lever, links pivotally connecting one end of said lever with said platform, a counterbalancing weight on the other end of said lever, a pump plunger, a plunger rod pivotally connected to said lever, a discharge spout from the pump chamber; and a receiving trough having lateral branches pivoted at one end and having its other end suspended from said lever.

2. A pumping apparatus, comprising a pump-chamber, a pivoted platform, an oscillating lever, links pivotally connecting one end of said lever with said platform, a counterbalancing weight on the other end of said lever, a plunger rod pivotally connected to said lever, a discharge spout from the pump chamber; a filter discharging into the well, and a double-walled trough having one end pivotally connected with the filter and its other end suspended from said lever.

3. In a pumping apparatus, the combination of a pump-chamber, a pivoted platform, an oscillating lever, links pivotally connecting one end of said lever with said platform, a counterbalancing weight on the other end of said lever, a pump plunger, a plunger rod pivotally connected to said lever, a discharge spout from the pump chamber; a receiving trough pivoted at one end and having its other end suspended from said lever; and a spring connected with said lever and adapted to come into play as the platform is depressed and approximately regulate the descent of the platform and the amount of water pumped by the weight of the animals upon the platform.

4. A pumping apparatus, comprising a pump-chamber, a pivoted platform, an oscillating lever, links pivotally connecting one end of said lever with said platform, a counterbalancing weight on the other end of said lever, a plunger rod pivotally connected to said lever, a discharge spout from the pump chamber, a filter; a double-walled trough having one end connected with the filter, and having lateral branches, and its other end suspended from said lever; and a drinking receptacle beneath the trough adapted to receive water therefrom.

5. In a pumping apparatus, the combination of a pump-chamber, a plunger therein, a lever pivoted on a standard above the pump-chamber, a plunger rod pivotally connected to said lever, a weight on one end of said lever; a tilting platform adjacent the other end of said lever, a link pivotally connecting the platform to said lever, a receiving trough pivoted at one end and having a spout at its receiving end, a pipe connected with said spout and leading to the well; links connecting the said trough to the said lever adjacent the platform, said weight counterbalancing the trough and platform; and a pipe leading from the pump-chamber adapted to discharge into the trough when the platform is depressed.

6. In a pumping apparatus, the combination of a pump-chamber, a plunger therein, a lever pivoted on a standard above the pump-chamber, a plunger rod pivotally connected to said lever, a weight on one end of said lever; a tilting platform adjacent the other end of said lever, a link pivotally connecting the platform to said lever, a receiving trough pivoted at one end and having a spout at its receiving end, a pipe connected with said spout and leading to the well, links connecting the said trough to the said lever adjacent the platform, said weight counterbalancing the trough and platform; a spring arranged to come into operation and supplement the weight and limit the depression of the plunger approximately to the weight of the animals on the platform; and a pipe leading from the pump-chamber adapted to discharge into the trough when the platform is depressed.

7. In a pumping apparatus, the combination of a pump-chamber, a plunger therein, a lever pivoted on a standard above the pump-chamber, a plunger rod pivotally connected to said lever, a weight on one end of said lever; a tilting platform adjacent the other end of said lever, a link pivotally connecting the platform to said lever, a receiving trough pivoted at one end and having a spout at its receiving end, a pipe connected with said spout and leading to the well, said trough having laterally extending branches and having an intermediate outlet adapted to discharge water, and a drinking receptacle under said intermediate outlet, substantially as described.

8. In a pumping apparatus, the combination of a pump-chamber, a plunger therein, a lever pivoted on a standard above the pump-chamber, a plunger rod pivotally connected to said lever, a weight on one end of said lever; a tilting platform adjacent the other end of said lever, a link pivotally connecting the platform to said lever, a receiving trough pivoted at one end and having laterally extending branches and double-walls and an intermediate outlet a spout at the receiving end of the trough, a pipe connected to said spout and leading to the well, links connecting the said trough to the said lever adjacent the platform, and a drinking receptacle under said intermediate outlet, substantially as described.

In testimony that I claim the foregoing as my own, I affix my signature in presence of two witnesses.

SULLIVAN W. EDMISTON.

Witnesses:
  S. C. HILL,
  ARTHUR E. DOWELL.